United States Patent
Kuehn et al.

(10) Patent No.: US 12,504,931 B2
(45) Date of Patent: Dec. 23, 2025

(54) CONTROLLING AND VISUALIZING COLOR REPRODUCTION ACCURACY

(71) Applicant: Fiery, LLC, Fremont, CA (US)

(72) Inventors: Mario Kuehn, Duisburg (DE); Dirk De Baer, Berchem (BE)

(73) Assignee: FIERY, LLC, Fremont, CA (US)

(*) Notice: Subject to any disclaimer, the term of this patent is extended or adjusted under 35 U.S.C. 154(b) by 0 days.

(21) Appl. No.: 18/527,154

(22) Filed: Dec. 1, 2023

(65) Prior Publication Data
US 2025/0123778 A1   Apr. 17, 2025

Related U.S. Application Data

(60) Provisional application No. 63/589,935, filed on Oct. 12, 2023.

(51) Int. Cl.
G06F 3/12 (2006.01)

(52) U.S. Cl.
CPC .......... G06F 3/1208 (2013.01); G06F 3/121 (2013.01); G06F 3/1234 (2013.01)

(58) Field of Classification Search
CPC .................. G06F 3/1208; G06F 3/1234
USPC .............. 358/1.9, 3.23, 3.24, 504, 518
See application file for complete search history.

(56) References Cited

U.S. PATENT DOCUMENTS

| | | | |
|---|---|---|---|
| 10,599,086 B1 * | 3/2020 | Dickinson | G03G 15/5083 |
| 2002/0149786 A1 | 10/2002 | Hudson et al. | |
| 2002/0186275 A1 | 12/2002 | Usui | |
| 2005/0177321 A1 | 8/2005 | Wang et al. | |
| 2006/0098217 A1 * | 5/2006 | Chang | H04N 1/60 358/1.9 |
| 2010/0165364 A1 * | 7/2010 | Qiao | H04N 1/603 358/1.9 |
| 2012/0092701 A1 * | 4/2012 | Wang | H04N 1/6033 358/1.15 |
| 2013/0088729 A1 * | 4/2013 | Fu | H04N 1/60 358/1.9 |
| 2013/0322701 A1 * | 12/2013 | Szymanski | H04N 1/6036 382/112 |
| 2015/0049921 A1 * | 2/2015 | Crean | G06V 10/56 382/112 |
| 2017/0374237 A1 * | 12/2017 | Muller | H04N 1/00087 |
| 2019/0301941 A1 | 10/2019 | Kawabata et al. | |
| 2021/0294552 A1 * | 9/2021 | Fujita | G06F 3/1255 |
| 2022/0294910 A1 * | 9/2022 | Morales | G06F 3/1285 |
| 2022/0360672 A1 * | 11/2022 | Meireson | B41F 33/0036 |
| 2022/0374946 A1 | 11/2022 | Kass et al. | |
| 2023/0153979 A1 | 5/2023 | Zamir et al. | |
| 2023/0379413 A1 * | 11/2023 | Vandenbussche | H04N 1/00087 |

FOREIGN PATENT DOCUMENTS

WO   2022079064 A1   4/2022

\* cited by examiner

*Primary Examiner* — Jamares Q Washington
(74) *Attorney, Agent, or Firm* — PERKINS COIE LLP

(57) ABSTRACT

A flexible method checks printer status, the quality and freshness of the printer calibration, and media profiles, and visualizes the results to the user in an easily understandable way. The so-determined device status can be used for an actual status update, stored within a cloud, and used for status tracking and decision-making.

36 Claims, 8 Drawing Sheets
(7 of 8 Drawing Sheet(s) Filed in Color)

Fiery Spot Color Report

Fiery server : SERVER-C4352D66
Print engine : B7000_86000
Spot Color library : Checkup
Spot Colors : 25
Output profile : C10000VP/C8000VP (JP) v2F
Created : 2023-11-23 20:36:01

48.00% of spot colors indicate good health
(indicated in the health score column with a highest possible score of 10).

| Color | Name | Separation | | | | Predicted L*a*b* | | | Measured L*a*b* | | | Deviation | Health score | |
|---|---|---|---|---|---|---|---|---|---|---|---|---|---|---|
| | | Cyan | Magenta | Yellow | Black | L* | a* | b* | L* | a* | b* | | | |
| | PANTONE 7506 U | 0.8 | 9.0 | 37.6 | 0.0 | 88.61 | 1.46 | 21.46 | 87.89 | 2.33 | 17.76 | 2.34 | 6 | |
| | PANTONE 7507 U | 0.4 | 12.5 | 43.5 | 0.0 | 86.87 | 3.16 | 27.64 | 86.75 | 3.26 | 25.94 | 0.80 | 10 | |
| | PANTONE Black 6 U | 56.9 | 54.1 | 47.1 | 43.5 | 33.20 | 0.92 | -5.51 | 32.63 | 0.55 | -7.69 | 1.86 | 7 | |
| | PANTONE 304 U | 39.2 | 1.2 | 14.9 | 0.0 | 77.88 | -16.12 | -18.04 | 75.83 | -17.46 | -17.34 | 1.74 | 7 | |
| | PANTONE 306 U | 57.5 | 1.2 | 8.2 | 0.0 | 65.09 | -25.71 | -36.16 | 64.02 | -24.23 | -37.58 | 1.32 | 8 | |
| | PANTONE Process Blue U | 86.3 | 23.1 | 4.7 | 0.8 | 49.58 | -19.71 | -46.38 | 50.56 | -15.70 | -46.29 | 2.26 | 6 | |
| | PANTONE 265 U | 42.4 | 55.7 | 1.6 | 0.0 | 53.80 | 21.26 | -31.49 | 54.71 | 16.63 | -29.61 | 2.55 | 6 | |
| | PANTONE 182 U | 0.0 | 36.9 | 20.4 | 0.0 | 77.41 | 23.44 | 0.12 | 77.36 | 24.07 | -3.39 | 2.23 | 6 | |
| | PANTONE 183 U | 0.4 | 58.4 | 34.9 | 0.0 | 65.14 | 39.73 | 7.84 | 65.02 | 38.73 | 5.92 | 1.33 | 8 | |
| | PANTONE 184 U | 0.8 | 71.4 | 46.7 | 0.0 | 58.21 | 49.24 | 15.50 | 58.45 | 48.80 | 12.58 | 1.56 | 7 | |
| | PANTONE 185 U | 0.4 | 82.7 | 60.4 | 0.0 | 52.93 | 56.63 | 26.05 | 53.17 | 56.40 | 21.41 | 2.36 | 6 | |
| | PANTONE Cool Gray 4 U | 24.7 | 21.6 | 30.2 | 0.0 | 74.79 | 0.04 | -0.65 | 75.88 | 1.67 | 0.24 | 2.61 | 6 | |
| | PANTONE Cool Gray 5 U | 29.0 | 25.5 | 32.5 | 0.0 | 71.27 | -0.17 | -1.32 | 72.42 | 1.98 | -1.04 | 3.23 | 5 | |
| | PANTONE Cool Gray 6 U | 32.5 | 29.0 | 34.5 | 0.8 | 67.89 | -0.19 | -1.89 | 69.28 | 2.48 | -2.15 | 3.95 | 5 | |
| | PANTONE Cool Gray 7 U | 35.3 | 32.2 | 36.5 | 2.0 | 64.87 | -0.11 | -2.00 | 66.28 | 1.18 | -2.21 | 2.22 | 6 | |
| | PANTONE Cool Gray 8 U | 38.0 | 34.9 | 38.4 | 4.3 | 61.57 | -0.29 | -2.01 | 62.40 | 0.91 | -3.24 | 2.17 | 6 | |
| | PANTONE Cool Gray 9 U | 41.2 | 38.4 | 40.4 | 7.1 | 57.82 | -0.16 | -2.41 | 58.67 | 1.02 | -4.10 | 2.35 | 6 | |
| | PANTONE 2106 U | 26.3 | 20.0 | 14.1 | 0.0 | 76.49 | 1.91 | -13.34 | 75.78 | 2.66 | -13.61 | 0.96 | 9 | |
| | PANTONE 2107 U | 37.3 | 30.2 | 19.2 | 0.0 | 66.53 | 1.71 | -18.43 | 65.94 | 2.47 | -15.87 | 1.18 | 8 | |
| | PANTONE 171 U | 0.4 | 69.4 | 67.5 | 0.0 | 58.85 | 45.53 | 34.83 | 58.02 | 46.64 | 32.08 | 1.92 | 7 | |
| | PANTONE 172 U | 0.8 | 75.7 | 77.3 | 0.0 | 55.82 | 49.75 | 40.99 | 54.04 | 52.00 | 39.40 | 2.30 | 6 | |

FIGURE 6

CONTROLLING AND VISUALIZING COLOR REPRODUCTION ACCURACY

CROSS-REFERENCE TO RELATED APPLICATIONS

This application claims priority to provisional patent application Ser. No. 63/589,935, filed Oct. 12, 2023, which application is incorporated herein in its entirety by this reference thereto.

FIELD

Various of the disclosed embodiments concern controlling and visualizing color reproduction accuracy.

BACKGROUND

Controlling the accuracy of printing is widely used. Standards from, e.g. the Fogra (https://fogra.org/en/) or the IDEAlliance (https://idealliance.org/), define the controlled parameters as well as the allowed deviations.

State of the art print process validation routines are usually based on an offset reference gamut and, because of this, they exclude the specifics of the digital printing system itself. These validation routines deliver a wide range of parameters that are difficult for the user to understand. For example, getting a passed or failed result oversimplifies the information provided to the user without providing guidance or insights into, for example, why a failed result was returned.

SUMMARY

Embodiments of the invention described herein overcome the above mentioned limitations of state of the art print process validation routines. Embodiments of the invention combine a comprehensive analysis of the status of the print system, accuracy, and freshness of the calibration and media profile with a visualization that is easy for the user to understand.

BRIEF DESCRIPTION OF THE DRAWINGS

This patent or application contains at least one drawing executed in color. Copies of this patent or application publication with color drawing(s) will be provided by the Office upon request and payment of the necessary fee.

FIG. 6 shows the health checkup report of FIG. 5 apart from the reporting application according to the invention;

DETAILED DESCRIPTION

CMYK (also known as process or four-color) printing involves laying tiny halftone dots of color (Cyan, Magenta, Yellow and Black) onto a substrate in combinations and formations that fools the human eye into perceiving continuous color.

In analog printing, spot (sometimes referred to as solid) colors differ in that there is no mixing of colors in the printing process. Instead, colors come as pre-mixed recipes. As an example, a specific shade of green may be achieved through process printing by mixing certain combinations of yellow and cyan inks. In digital printing, spot colors are created by mixing printing colors, e.g. CMYK, from the digital press. However, in all cases differences in printers, inks, and calibration settings could lead to very different results. Meanwhile, that same shade of green can be achieved with spot colors through a precisely pre-mixed recipe.

Spot colors are widely used in printing processes. For example, spot colors are used in company logos, in specific designs, and in artworks where the reproduction of a specific color is of essential interest. Accurate printing of these colors is so important in the printing industry that print shops always need to know how accurately they can reproduce these specific colors for their customers. This accuracy must be tracked, and deviations must be corrected, as necessary.

Which and how many spot colors a print shop is handling in its daily production is subject to broad variations. Across print shops there can be any number of spot colors from zero to many hundreds. Besides that, the spot colors used are not harmonically spread across the color gamut. Also, for their distribution any combination of spot colors is possible. The herein described validation process is as flexible as these conditions. It can be deployed to any number of spot colors of any color value and distribution. In alternative embodiments, the herein disclosed validation process can also be deployed to any number of key colors of any color value and distribution.

Besides flexibility print shop owners need an effortless way to validate their print quality conditions, an easily understandable result, and guidance for corrections, as needed. Embodiments of the invention address these needs as well.

Figure 1:
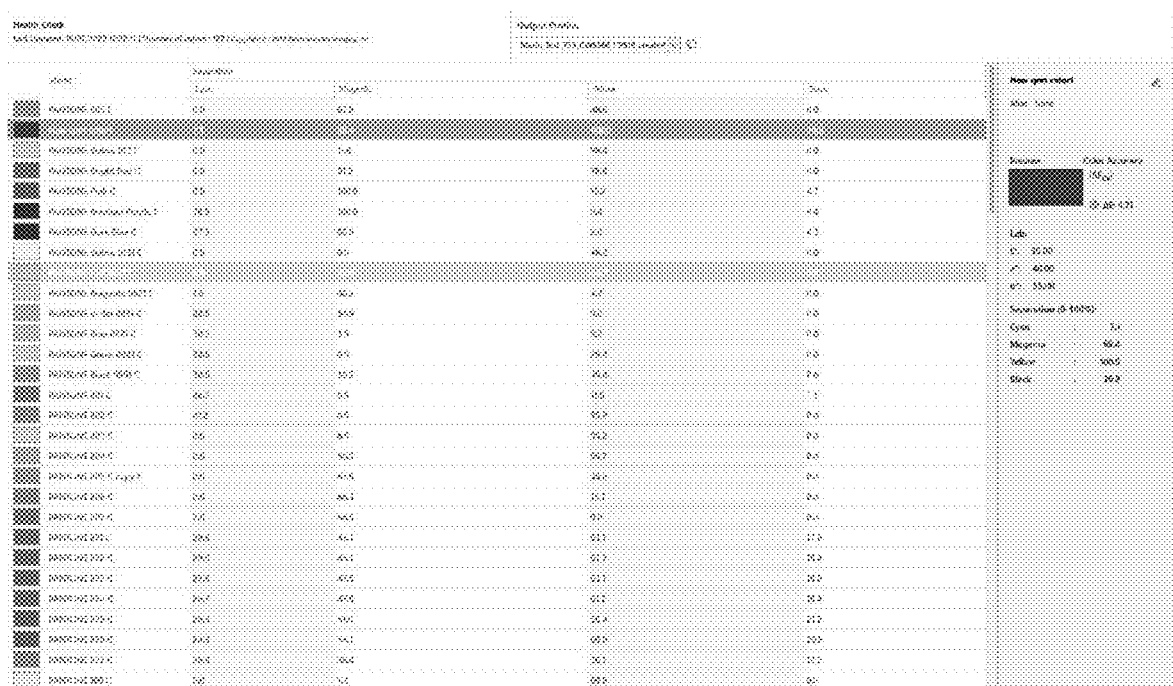
FIG. 1 is a screenshot that shows a spot color library according to the invention.

FIG. 1 is a screenshot that shows a spot color library according to the invention. In FIG. 1, the screenshot gives an overview of the starting point. The user selects a spot color library with the quality critical colors. This could be a custom library as in the sample case herein or this can be a standard library, e.g. Pantone.

Figure 2:
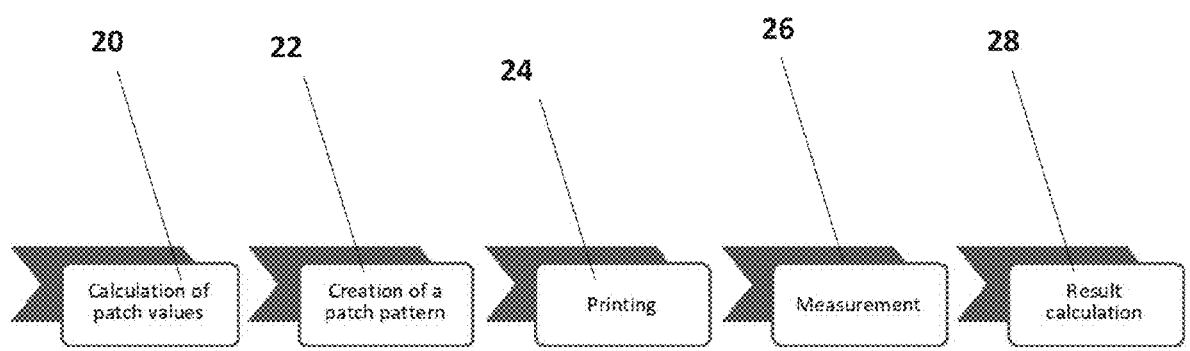
FIG. 2 is a flow diagram that describes the high-level process according to the invention.

FIG. 2 is a flow diagram that describes a high-level process according to an embodiment of the invention. The operator defines several spot colors or key colors that are important to validate. This can either be a default library (see FIG. 1), such as the PANTONE coated library, or a custom library, which could include just those spot colors which are printed most often or which are most relevant for their specific print products.

For each of these spot colors the CIE L*a*b* color values, the unit in which these colors are usually defined, is converted into the printer color space 20. A state-of-the-art ICC (International Color Consortium) based color management module (CMM) can be used for this. Typically, the CMM is a software algorithm that adjusts the numerical values that are sent to or received from different devices so that the perceived color they produce remains consistent. The CMM handles the color conversion between two devices. There is a process for colors which are in gamut (the composition is different but the appearance is the same) and for colors which are out of the gamut. It is understood that the latter colors can only be reproduced as best as possible but not perfectly accurately. Such a CMM converts colors using a well-defined description of the color behavior of a device. This description, stored in the ICC profile format, which is an ISO standardized format, allows conversion of a device independent color in CIE L*a*b* color space to the device dependent color space of the printer. Embodiments of the invention use a multi-dimensional interpolation table for this. Table 1 provides an example of a multi-dimensional interpolation table, e.g. a two-dimensional interpolation table.

TABLE 1

Multi-Dimensional Interpolation Table

| F(x, y) | 0 | 2 |
|---|---|---|
| 0 | 0 | 0 |
| 2 | 0 | 1 |

The x and y values are in the range 0 to 1. To find a value for a certain (x,y) combination look at the x value in the row header and y value in the column header. The result for combination (0,0) is on the first column, first row and has value 0, so F (0,0)=0, the value for (0,2) is also 0, for value (2,0) also and finally for value (2,2) it is 1. Intermediate values such (x,y)=(1,1) are calculated from these entries by the following, simplified, formula:

$$F(x, y) = ((2 - x) * (2 - y) * F(0, 0) + \quad (1)$$
$$(2 - x) * y * F(2, 0) + x * F(0, 2) + x * y * F(2, 2))/4$$

So:

$$F(1, 1) = (1 * 1 * 0 + 1 * 1 * 0 + 1 * 1 * 0 + 1 * 1 * 1)/4 = 1/4 \quad (2)$$

This formula is easily extended to any dimension and to any number of grid points on the axis.

Out of these patch values a patch pattern is generated 22 that is appropriate for the specific spectrophotometer, such as for example the ES3000, colorimeter or any capturing device, including a scanner or camera, that allows derivation of a colorimetric interpretation of substrate surface color, applied by the user.

Figure 3:
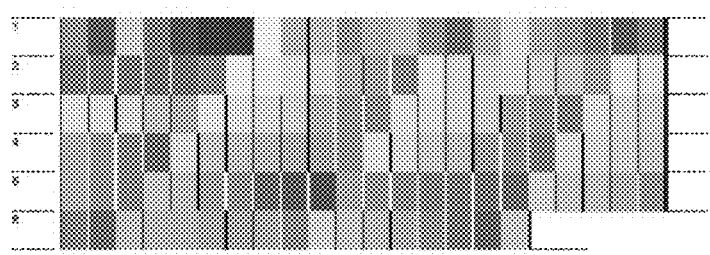
FIG. 3 shows a patch pattern for a spot color health check file according to the invention.

FIG. 3 shows a patch pattern for a spot color health check file according to the invention. This is the measurement file created for a Fiery ES3000 handheld measurement device. The colors of the spot color table as measurement patches are shown within FIG. 3.

The patch pattern is printed 24 and the printed patch pattern is measured 26 by the user via the color capturing device. The measurement results are processed further. In embodiments of the invention this process involves comparing the measured values for each of the patches in the pattern to a corresponding value predicted by the ICC profile or other description of the color behavior of the device. The foregoing discussion concerns an embodiment of the invention. Those skilled in the art will appreciate that other methods could be used as well.

Within this process, a CIE L*a*b* lookup table (LUT) of the media profile or any other appropriate conversion table is used to convert a recipe for each spot color into a predicted CIE L*a*b* value. As already mentioned above, for this prediction either an ICC profile or other color behavior description of the device is used. In this prediction the profile or color behavior description uses the device values that were chosen by the printing workflow to render the spot color, which is a CMYK value or whatever colorant combination the device happens to use, into a device independent color value such as CIE L*a*b*. This CIE L*a*b* value is then compared with the measurement results of this patch and a deviation between these two is calculated 28. Comparison of two colors, in the CIE L*a*b* color space, can be done by using any color difference expression, such as for example Delta E 1976 or Delta E 2000 as standardized by the CIE, that allows estimation of the color difference experience by the human eye based on two colors represented by their CIE L*a*b* values. Those skilled in the art will appreciate that Delta E is not the only value which leads to a health score. For this evaluation also combination of different values can be used, with and without Delta E, such as Delta E+Delta H or Delta E+Delta CH+Delta H, etc.

Figure 4:
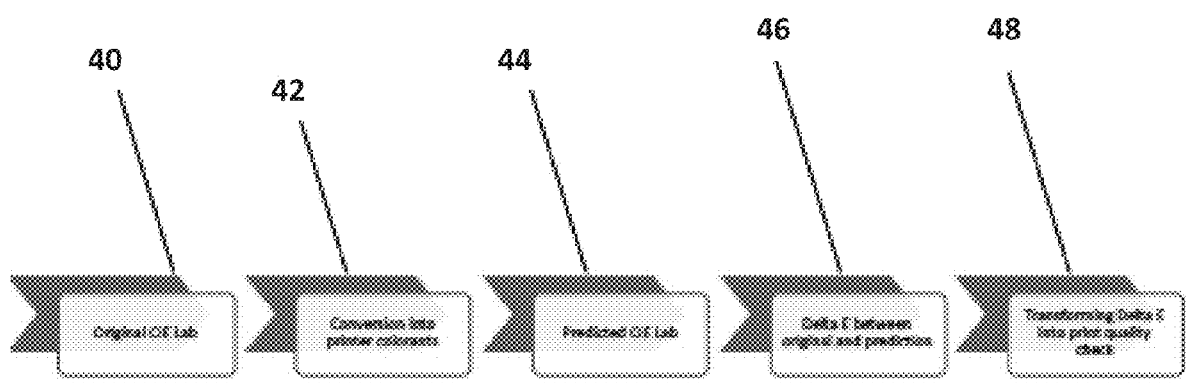
FIG. 4 is a flow diagram that describes the data processing process according to the invention.

FIG. 4 is a flow diagram that describes the data processing process according to the invention. The original CIE L*a*b* value 40 is converted into printer colorants 42. This conversion uses the ICC profile for the device, or another description, that describes how to translate CIE L*a*b* values back to a corresponding device value combination necessary to make a good rendering on the device of the color represented by the CIE L*a*b* value. CIE L*a*b* values are predicted 44, using the conversion tables in the ICC profile or another model for the device colors, and the color difference between the original patch and the prediction is determined 46 using any of the color difference formulas mentioned above. The color difference value is then transformed into a print quality check 48. This print quality check is a translation of the color difference values, which are not easy to interpret by users not familiar with color science, into an easier to understand overall print quality score value in a common bad to good range, such as for example 0 to 10, by applying a conversion formula that translates a summary of the Delta E values for all patches into a value within the chosen score range.

A simple example of a conversion formula is:

$$F(DeltaE) = \text{ROUND}(\text{MAX}(0, 10 - DeltaE), 0) \quad (3)$$

This formula results in Table 2 below.

TABLE 2

Conversion Table

| DeltaE Range | Corresponding Score |
|---|---|
| 0-0.99 | 10 |
| 1-1.99 | 9 |
| 2-2.99 | 8 |
| 3-3.99 | 7 |
| 4-4.99 | 6 |
| 5-5.99 | 5 |
| 6-6.99 | 4 |
| 7-7.99 | 3 |
| 8-8.99 | 2 |
| 9-9.99 | 1 |
| >10 | 0 |

Those skilled in the art will appreciate that Delta E is only one option. Combinations of Delta E+Delta CH or Delta H or even just lightness differences, etc. are used or can be used for this purpose. Thus, instead of looking at a certain wide range of values or differences the user sees one color marked parameter.

This feature of the invention provides a health score that is better than a simple thumbs up or down method. Thus, a report is generated to visualize the results of the process.

Figure 5:
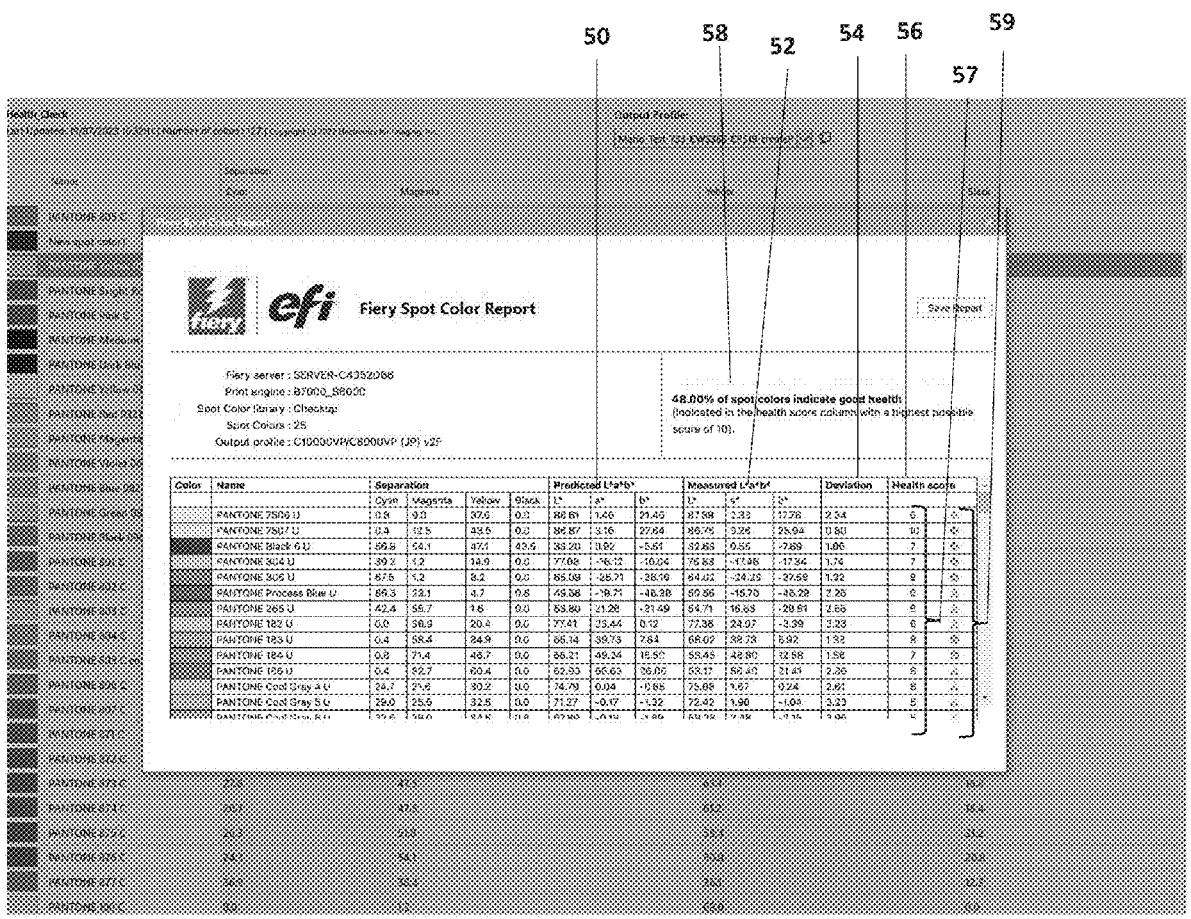
FIG. 5 is a screenshot that shows health checkup a report within a reporting application for the spot color library of FIG. 1 according to the invention.

FIG. 5 is a screenshot that shows a health checkup report within a reporting application for the spot color library of FIG. 1 according to the invention. The screenshot in FIG. 5 shows how the results are represented after the validation with the spot color library of FIG. 1, which is shown in the background on FIG. 5.

In FIG. 5, predicted L*a*b* values 50, Measured L*a*b* 52 values, and DeltaE values (Deviation) 54 are shown for each spot color. The health score 56 is also shown for each spot color. To make it easy to understand a score of how well the spot colors are printing, the measured values 52 are compared to the prediction 50 using any of the color difference formulas mentioned above and the translation of this color difference into a health score 56, i.e., a bad to good score range of for example 0 to 10. In embodiments of the invention a scale of 1-10 (57) is used, with 10 being the best score and 1 representing the lowest score. An indicator 59 is also shown, for example a green circle with a checkmark for acceptable health scores and a yellow triangle with an exclamation mark for unsatisfactory health scores. This visualization provides an easily understandable result, i.e. the Health Score, which is reported to the user. Those skilled in the art will appreciate that other scales or quality indicators may be used to apprise the user of print quality.

In embodiments of the invention, the report also summarizes the overall % of spot colors that printed acceptably 58. A state-of-the-art digital front end (DFE) such as the Fiery Digital Front End (http://www.Fiery.com) has capabilities to improve low scores. To improve the score any mathematical multi-dimensional optimization technique can be used, for example a down-hill gradient search, employing either the prediction table in an ICC profile or a high precision description of the color behavior of the device. The goal of the optimization technique is to reduce the color difference, expressed by a color difference formula, between the actual color and the predicted color.

Regular use of this process can give the printer operator the confidence that their important spot colors print to the best of their press' capability.

In the case that the results do not meet the quality expectations of the print shop, a correction is necessary. The specifics of the deviations provided in the report can be used to guide the user to the right correction steps to adjust the print process optimally, reducing the deviation, and improving the spot color reproduction.

For example:
If predicted values cannot be achieved the printer is not correctly calibrated or profiled;
If the predicted deviation of inner gamut colors is high, the profile quality is not good and reprofiling is necessary;
If predicted deviation of inner gamut colors is high, there is a need for optimization of spot color recipes; and
If many spot colors are out of gamut, the gamut too small and a different paper, press, or print mode should be used.

FIG. 6 shows the health checkup report of FIG. 5 apart from the reporting application according to the invention. In embodiments of the invention, this report is independently provided in a PDF or other form for a more detailed analysis and archiving in the cloud (see FIG. 7 below).

Figure 7:
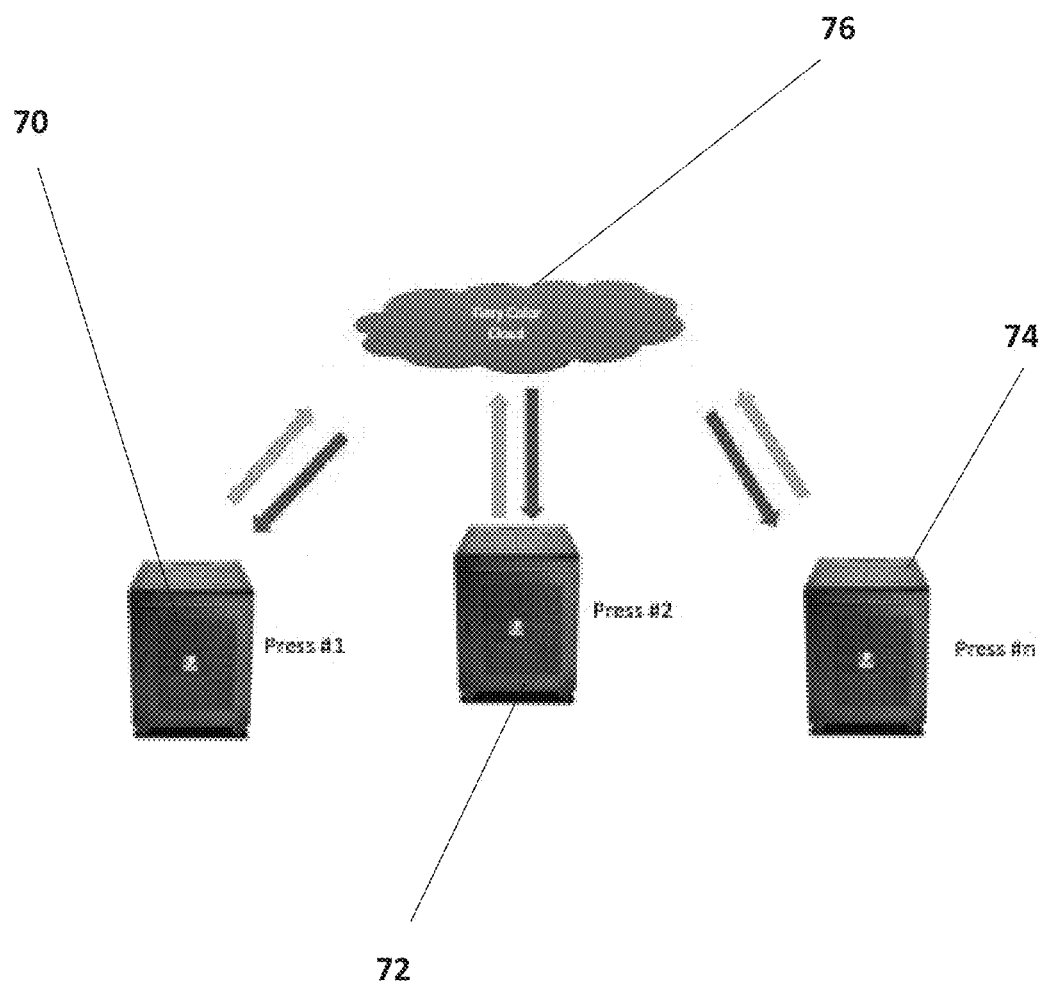
FIG. 7 is a block diagram showing a cloud connection process according to the invention.

FIG. 7 is a block diagram showing a cloud connection process according to the invention. Storing the determined data, spot colors, measurement results, and others, within a cloud environment extends the benefits for the print shops. In this embodiment, the collected current data can be compared with previous reached results at the same printing device as well as with other devices within the printer fleet. This allows the print shop owner to see if the current press is in a proper state of repair or if maintenance is needed.

Another important advantage afforded by this embodiment of the invention is the ability to compare the accuracy of the current reproduction with other presses. In FIG. 7, Press #1 (70), Press #2 (72), and Press #n (74) communicates with a cloud server 76. The presses upload measurements, metadata, calibration information, and profile information to the cloud server and receive analysis of current state, comparison with other presses within the press fleet, guidance for decision making, and guidance for appropriate maintenance action from the cloud server.

Specifically, for the spot colors within a particular printing job the best fitting printing press can be selected. This allows work, in addition to planned print production, based on machine availability and quality. With the data from all printing presses within the fleet available, the print shop operator can select the best fitting printing press for a particular job.

Furthermore, load balancing, the use of multiple printing presses to reduce production time, can be planned based on current print quality criteria. Embodiments of the invention provide the same advantage if a reproduction of a printing job is necessary. For example, some print jobs are prepared with a specific, often high quality, printing press in mind. Colors are chosen to get the most pleasing appearance of the print. A different printer does not necessarily, and in fact usually does not, have the same color capabilities as the original printer for which the job was designed. However, the desire is to reproduce the original job as best as possible on the new printer. Spot colors, which are individually used colors of, for example, logo's require extra care because they are often very recognizable and need to be rendered as accurately as possible. The technique described in this invention allows printer's to do this more reliably.

In embodiments of the invention, a print shop operator can also select the best suited press by comparing the previous press' quality status with that of the current press. In the health check the prediction is compared against a patch measurement as described above.

In other embodiments of the invention it is possible to judge and pick the press which is best for reproducing a job that is not using a spot color. In such embodiments, instead of spot colors, key colors of the print job are selected. For purposes of this embodiment, key colors are any dominant colors but not necessarily spot colors. For example, in an image that includes a substantial amount of sky a set of blue values is such a set of key colors for this image. In such embodiment the key colors are used as patches.

To pick the best press out of a set of different presses or different presses and substrate options the goal is to pick the press which prints the spot colors or key colors best or as well as another previously selected press. In the case of spot colors this requires a comparison between target CIE L*a*b* values of the spot colors and the measurements. All other things, e.g. the comparison routines and the health score, if desired to use them for this too, can be kept the same. Only the data being compared needs to be modified.

Thus, instead of spot colors, specific key colors of the job are used. This embodiment does not check something generic, such as a Pantone table, but something very job specific, such as important or often used colors within a job.

A cloud-based embodiment of the invention can offer a temporal overview about the health check results of individual presses and can offer a comparison between different devices, different substrates, etc.

The herein above-described decisions are based on a visual interpretation of data by the local operator. An appropriate routine can be trained and support or guide the operator within this decision-making process. For example, embodiments can offer the user an option to define a threshold. From then onwards whenever the health score is below the threshold a correction must be made.

In another embodiment a threshold is calculated or set by the system as a result of certain other settings, e.g. Quality of the substrate, other color verification results, etc.

In another embodiment the system learns from previous print results and fine tunes the threshold.

Those skilled in the art will appreciate that there are embodiments that use other criteria than thresholds.

As explained previously, it is not always possible to render a color on a device and the most viable alternative must be found. What is best is however a matter of preference, and different people and/or different goals for the print job demand different choices. How the choices are made can be stored for future use. In this way the system can learn the preferences of the user. The guidance provided from such a solution can be based on a single point of information, e.g., just the particular fleet and the use of the presses and previous operator decision, as well as a wider use of such data. The use of data from many customers with similar printing presses and similar quality expectations can be used to train such a routine. With the information about other presses the user can qualify if the current press or any press of in the fleet is in a proper shape or underruns the default or even the optimal quality of the press type. The performance of the device or the device printing on a particular substrate becomes comparable. This feature can be deployed in an automatic manner, where the cloud implementation informs the user and proposes solutions to improve or similar, or the user simply sees that the same press can do better.

Computer Implementation

Figure 8:
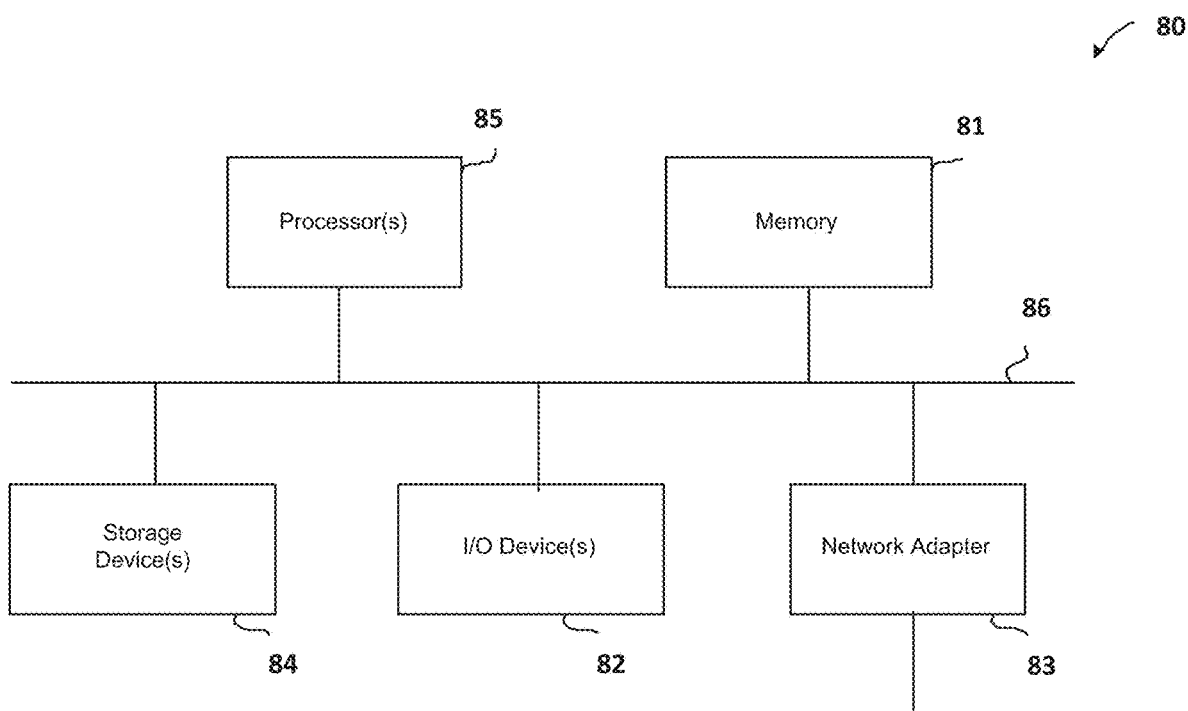
FIG. 8 is a block diagram of a computer system as may be used to implement certain features of some of the embodiments.

FIG. 8 is a block diagram of a computer system that may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 80 may include one or more central processing units ("processors") 85, memory 81, input/output devices 82, e.g., keyboard and pointing devices, touch devices, display devices, storage devices 84, e.g. disk drives, and network adapters 83, e.g., network interfaces, that are connected to an interconnect 86. The interconnect 86 is illustrated as an abstraction that represents any one or more separate physical buses, point to point connections, or both connected by appropriate bridges, adapters, or controllers. The interconnect 86, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 81 and storage devices 94 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 81 can be implemented as software and/or firmware to program the processor 95 to carry out actions described above. In some embodiments, such software or firmware may be initially provided to the processing system 80 by downloading it from a remote system through the computing system 80, e.g., via network adapter 83.

The various embodiments introduced herein can be implemented by, for example, programmable circuitry, e.g., one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification was chosen for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for controlling and visualizing color reproduction accuracy, comprising:
    selecting a spot color library containing quality critical colors relevant to expected visual fidelity;
    defining one or more spot colors from said spot color library for validation;
    deriving a colorimetric interpretation of substrate surface color of said spot colors with a capturing device;
    comparing measured values for each of said spot colors to a corresponding value predicted by an ICC profile or other description of printer color behavior; and
    applying a statistical or weighted conversion formula that translates a summary of deviations of said measured values for each of said spot color patches into a normalized print health score value within a predefined range indicative of overall print quality, wherein said health score is visually presented on an interpretable scale.

2. The method of claim 1, wherein said spot color library comprises any of a custom library or a standard library.

3. The method of claim 1, wherein said spot colors comprise any of colors which are printed most often or colors which are most relevant for specific print products.

4. The method of claim 1, wherein said color values comprise CIE L*a*b* color values.

5. The method of claim 4, further comprising:
using an ICC (International Color Consortium)-based color management module (CMM) to convert device independent color values in a CIE L*a*b* color space for said spot colors to values in a device dependent color space of said printer.

6. The method of claim 1, further comprising:
using a multi-dimensional interpolation table to store a color behavior description in an ICC profile format.

7. The method of claim 1, further comprising:
generating a patch pattern comprising each of said spot colors.

8. The method of claim 7, further comprising:
for each of said spot colors, converting color values from units in which said spot colors are defined into a printer color by adjusting numerical values sent to or received from said printer, using a description of color behavior for said printer, wherein a perceived produced color remains consistent.

9. A method for controlling and visualizing color reproduction accuracy, comprising:
printing a patch pattern comprising each of one or more spot colors for selected validation from a spot color library containing quality critical colors relevant to expected visual fidelity;
measuring a printed patch pattern with a color capturing device; and
processing results of said measuring by comparing measured values for each of said patches in said pattern to a corresponding value predicted by an ICC profile or other description of printer color behavior; and
applying a statistical or weighted conversion formula that translates a summary of deviations of said measured values for each of said spot color patches into a normalized print health score value within a predefined range indicative of overall print quality, wherein said health score is visually presented on an interpretable scale.

10. The method of claim 9, further comprising:
using a lookup table (LUT) of a media profile or any other conversion table to convert a recipe for each spot color into a predicted value.

11. The method of claim 10, further comprising:
comparing said predicted values with measurement results for said printed patch pattern.

12. The method of claim 11, further comprising:
using a color difference expression to calculate a deviation between said predicted value and said measurement results for said printed patch patterns.

13. The method of claim 11, wherein said predicted values and measurement results are in any of a CIE L*a*b* or spectral color space.

14. The method of claim 12, further comprising:
using any of Delta E 1976, Delta E 2000 Delta E, Delta E+Delta H, or Delta E+Delta CH+Delta H to calculate said deviation between said predicted values and said measurement results for said printed patch pattern.

15. A method for generating a printer health score, comprising:
converting an original CIE L*a*b* value into printer colorants using an ICC profile for said printer or another description that describes how to translate CIE L*a*b* values back to a corresponding printer value combination necessary to make an acceptable rendering on the printer of a color represented by a CIE L*a*b* value;
predicting CIE L*a*b* values using conversion tables in the ICC profile or another model for printer colors;
printing a patch pattern comprising each of one or more spot colors for selected validation from a spot color library containing quality critical colors relevant to expected visual fidelity;
measuring a printed patch pattern with a color capturing device;
determining a value for color difference between an original patch and the prediction values using any of Delta E 1976, Delta E 2000 Delta E, Delta E+Delta H, or Delta E+Delta CH+Delta H difference formulas;
transforming said color difference value into a print quality check comprising a translation of the color difference value into an easier-to-understand overall print quality score value in a common bad-to-good range by:
applying a statistical or weighted conversion formula that translates a summary of deviations of said measured values for each of said patches into a normalized print health score value within a predefined range indicative of overall print quality, wherein said health score is visually presented on an interpretable scale.

16. The method of claim 15, further comprising:
displaying for said printer a health score using a scale of 1-10, with 10 being a best score and 1 representing a lowest score.

17. The method of claim 15, further comprising:
displaying an indicator for acceptable health scores and for unsatisfactory health scores.

18. The method of claim 15, further comprising:
displaying a summary showing overall % of spot colors that printed acceptably.

19. The method of claim 15, further comprising:
using a mathematical multi-dimensional optimization technique to improve said health score by reducing color difference, as expressed by a color difference formula, between actual color and predicted color.

20. The method of claim 15, further comprising:
using specifics of deviations provided with said report to guide a user to correction steps to adjust a print process optimally, reducing deviation, and improving spot color reproduction.

21. The method of claim 20, wherein said correction steps comprise any of:
when predicted values cannot be achieved the printer is not correctly calibrated or profiled;
when a predicted deviation of inner gamut colors is high, the profile quality is not good and reprofiling is necessary;
when predicted deviation of inner gamut colors is high, there is a need for optimization of spot color recipes; and
when many spot colors are out of gamut, the gamut is too small and a different paper, press, or print mode should be used.

22. The method of claim 15, further comprising:
independently providing said report in a PDF or other form.

23. The method of claim 22, further comprising:
storing said report within a cloud environment.

24. The method of claim 23, wherein said report comprises collected current data for comparison with previous reached results at a same printing device as well as with other devices within a printer fleet.

25. The method of claim 23, wherein said report provides information whether a current press is in a proper state of repair or if maintenance is needed.

26. The method of claim 23, further comprising:
comparing accuracy of a reproduction on a current press with that of other presses.

27. A method for generating a printer health score, comprising:
converting an original CIE L*a*b* value into printer colorants using an ICC profile for said printer or another description that describes how to translate CIE L*a*b* values back to a corresponding printer value combination necessary to make an acceptable rendering on the printer of a color represented by a CIE L*a*b* value;
predicting CIE L*a*b* values using conversion tables in the ICC profile or another model for printer colors;
printing a patch pattern comprising each of one or more spot colors for selected validation from a spot color library containing quality critical;
measuring a printed patch pattern with a color capturing device;
determining a value for color difference between an original patch and the prediction values using any of Delta E 1976, Delta E 2000 Delta E, Delta E+Delta H, or Delta E+Delta CH+Delta H difference formulas;
transforming said color difference value into a print quality check comprising a translation of the color difference value into an easier-to-understand overall print quality score value in a common bad-to-good range by applying a conversion formula that translates a summary of the prediction values for all patches into a value within a chosen score range;
generating a report to visualize a printer health score;
independently providing said report in a PDF or other form; and
storing said report within a cloud environment; and
further comprising:
a plurality of presses uploading to a cloud server measurements, metadata, calibration information, and profile information; and
a plurality of presses receiving from a cloud server analysis of current state, comparison with other presses within a press fleet, guidance for decision-making, and guidance for appropriate maintenance action.

28. The method of claim 23, further comprising:
based upon said report, for spot colors within a particular printing job, selecting a best-fitting printing press within a press fleet.

29. The method of claim 23, further comprising:
based upon said report, using multiple printing presses to reduce production time based on current print quality criteria.

30. The method of claim 23, further comprising:
selecting a best-suited press by comparing a previous press's quality status with that of a current press.

31. The method of claim 23, further comprising:
In the health check, comparing a prediction comprising target CIE L*a*b* values of the spot colors against patch measurements; and
identifying a best press out of a set of different presses or different presses and substrate options by selecting a press which prints said spot colors best or at least as well as another previously selected press.

32. The method of claim 23, further comprising:
said report providing a temporal overview of health check results of individual presses for comparison between different devices and/or different substrates.

33. The method of claim 23, further comprising:
training a routine to support or guide an operator within a decision-making process.

34. The method of claim 32, further comprising:
storing how operator choices are made for future use to learn preferences of the operator.

35. The method of claim 32, further comprising:
using data from many customers with similar printing presses and similar quality expectations to train said routine.

36. A method for generating a printer health score, comprising:
converting an original key color value into printer colorants using a profile for said printer that describes how to translate said original color value back to a corresponding printer value combination necessary to make an acceptable rendering on the printer of a color represented by the original key color value;
predicting original key color values using conversion tables in the profile for printer colors;
printing a patch pattern comprising each of one or more key colors for selected validation;
measuring a printed patch pattern with a color capturing device;
determining a value for color difference between an original patch and the prediction values using a difference formula;
transforming said color difference value into a print quality check comprising a translation of the color difference value into an easier-to-understand overall print quality score value in a common bad-to-good range by:
applying a statistical or weighted conversion formula that translates a summary of deviations of said measured values for each of said patches into a normalized print health score value within a predefined range indicative of overall print quality, wherein said health score is visually presented on an interpretable scale.

* * * * *